(No Model.)

J. P. PUTNAM.
WATER CLOSET.

No. 285,926. Patented Oct. 2, 1883.

Witnesses:

Inventor:

UNITED STATES PATENT OFFICE.

JOHN PICKERING PUTNAM, OF BOSTON, MASSACHUSETTS.

WATER-CLOSET.

SPECIFICATION forming part of Letters Patent No. 285,926, dated October 2, 1883.

Application filed February 3, 1883. (No model.)

*To all whom it may concern:*

Be it known that I, JOHN PICKERING PUTNAM, of Boston, in the State of Massachusetts, have invented an Improvement in Water-Closets or Similar Waste-Receptacles, of which the following is a specification.

This application is for a modification of apparatus described in my application No. 63,041. In the apparatus shown in that application as illustrative of the invention therein broadly claimed, the main water-supply is introduced to the trapped basin of a water-closet or similar waste-receptacle from an air-tight chamber in which a column of water is normally supported by the pressure of the atmosphere upon water in the trapped basin, the passage-way from the said chamber entering the basin below the level of the seal of the trap. The present invention is within that broadly claimed in said original application, and is for a specific form of apparatus and details thereof. This specific form of apparatus is substantially like that of my said application No. 63,041, except that the chamber in which the column of water is supported by atmospheric pressure has two passages or mouths opening into the trapped basin below the level of the seal. The basin proper has a false bottom or diaphragm, which serves to separate the two passage-ways, and the arrangement is such that the water from the larger passage-way is directed immediately into the trap to overcome the inertia of the water therein, while the water from the upper and smaller of said passage-ways flows over the upper surface of the said false bottom or diaphragm. The smaller passage-way enters the basin above the larger, and, as will hereinafter appear, the required level of the water in the trapped basin is maintained by means of the upper passage-way, so that the lower passage-way may enter at any depth below that level and in any required direction. A supplementary pipe for flushing the upper part of the basin and an upper reservoir are also provided, as in the apparatus of said original application.

Figure 1:
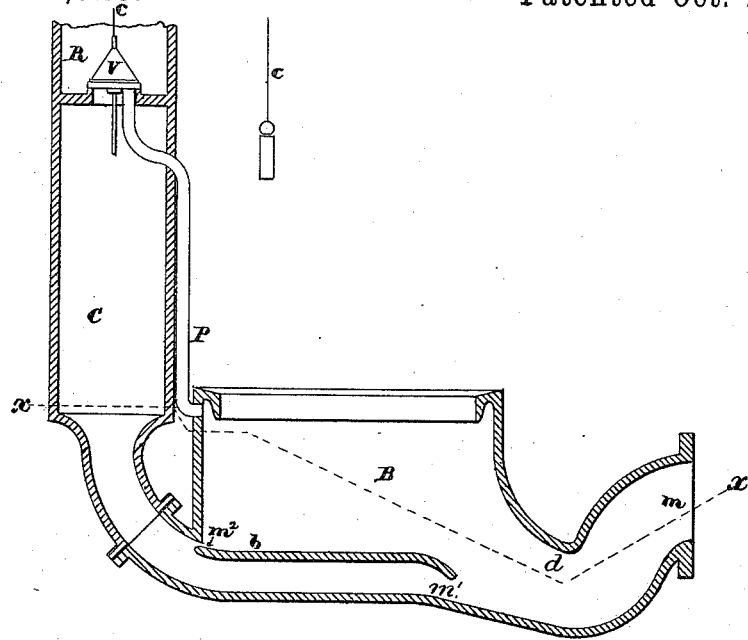
Figure 2:
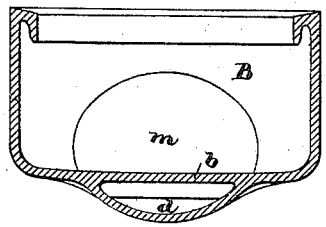
Figure 3:
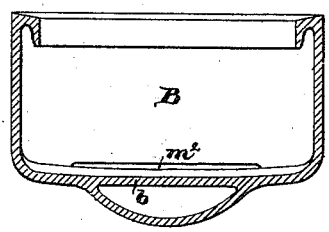
Figure 4:
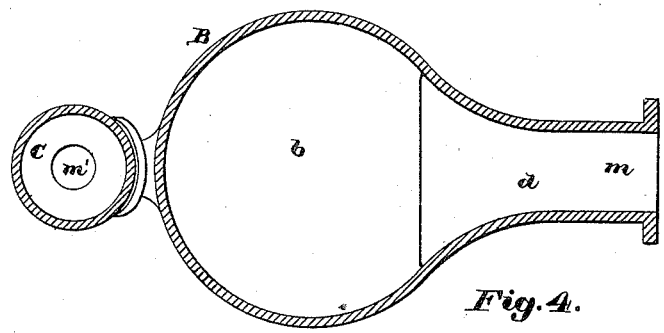

In the drawings, Figure 1 represents a vertical section of apparatus embodying the present invention as applied to a trapped water-closet. Fig. 2 is a vertical section of the same through the basin, looking toward the trap and discharge-passage. Fig. 3 is a partial vertical section through the basin, looking toward the supply-chamber. Fig. 4 is a plan on line $x\,x$ of Fig. 1.

B is the trapped basin, the dip of its seal being at $d$, and $m$ representing the discharge passage-way, as in the said original application. $b$ is the false bottom of the basin.

C is the immediate water-supply chamber, R a reservoir, V a valve, $c$ a valve-cord, and P a flushing-pipe, all substantially as described and shown in said original application, except that the chamber C has two mouths or passage-ways which enter the trapped basin below the water-line of the trap, one, $m'$, entering beneath the false bottom $b$, and extending thereunder to within close proximity to the trap, while the other, $m^2$, enters just above the false bottom $b$, as shown. Accordingly, as described in the application of which this is a modification, as aforesaid, when, by evaporation or siphonage, the water in the trapped basin falls below the mouth $m^2$, which is above the level of the lowest part of the dip $d$ and below the level of the lowest part of the outlet $m$, air enters the mouth $m^2$ and passes in bubbles to the top of the chamber C, and thereby causes the restoration of the required water-level in the trap.

The upper flushing takes place as described in my said application No. 63,041, and so, also, as is obvious, does the lower flushing, except that in the apparatus herein described the lower-flushing water enters in two streams, one flowing over the false bottom of the basin and the other acting directly upon the contents of the trap.

I claim—

1. The combination, with a trapped basin suitable for a water-closet or similar waste-receptacle, of an air-tight water-chamber provided with two mouths entering the trap of said basin, one above the other, but both below the level of the seal, substantially as described.

2. The combination, with the trapped basin B, of the air-tight water-chamber C, having the two mouths $m'$ and $m^2$, reservoir R, and valve V, substantially as described.

3. The combination of the basin B, reservoir R, chamber C, having the two mouths $m'$ and $m^2$, the pipe P, and valve V, substantially as described.

JNO. PICKERING PUTNAM.

Witnesses:
W. W. SWAN,
WM. S. ROGERS.